March 5, 1963  M. LOMBARDI  3,080,146
FAUCETS OR COCKS FOR CONTROLLING LIQUID FLOW
Filed Feb. 24, 1961
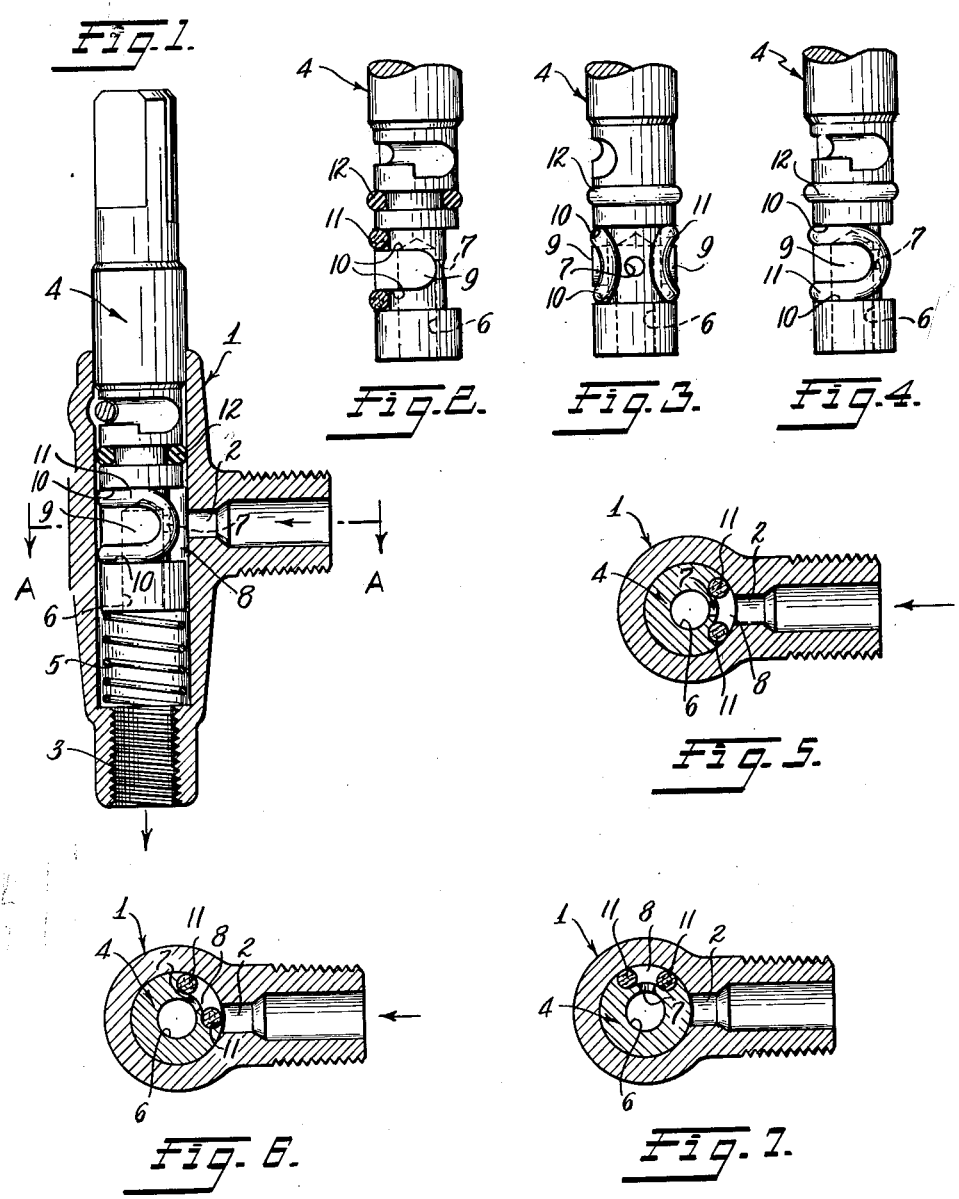
INVENTOR.
Michele Lombardi
BY
Bacon & Thomas
ATTORNEYS United States Patent Office 3,080,146
Patented Mar. 5, 1963

3,080,146
FAUCETS OR COCKS FOR CONTROLLING LIQUID FLOW
Michele Lombardi, 5/b Via Patrioti, Brescia, Italy
Filed Feb. 24, 1961, Ser. No. 91,349
2 Claims. (Cl. 251—310)

This invention relates to a cock or faucet, hereinafter and in the claims referred to simply as "faucet" for controlling liquids.

According to the present invention there is provided a faucet for controlling liquid flow comprising a body, a chamber located internally of the body, angularly displaceable plug means disposed in said chamber, liquid inlet and outlet means leading respectively to and from said chamber, a longitudinal recess in said plug and in communication with said outlet, a transverse aperture in the plug in communication with said recess, port means in the plug in communication with said aperture and adapted to communicate to a greater or lesser degree with the inlet means depending on the angular position of the plug.

An embodiment of the invention will now be described by way of example with reference to the accompanying drawings, in which FIG. 1 shows a vertical section through a faucet according to the invention;

FIGS. 2, 3 and 4 show a part of the faucet of FIG. 1, in section and from either side respectively; and FIGS. 5, 6 and 7 are sections on the line A—A of FIG. 1, showing the faucet set for maximum flow, minimum flow and discontinued flow respectively.

Referring now to the drawings, the faucet has a body 1 provided with a liquid inlet 2 and a liquid outlet 3. A plug 4 is housed in a chamber in the body 1 and is resiliently located by a spring 5. The plug is adapted for angular displacement inside the body 1, and is provided with a longitudinal cylindrical recess 6 and a transverse cylindrical aperture 7 which communicates with the recess 6. During operation of the faucet, the spring 5 positions the aperture 7 on a level with inlet 2.

The plug 4 has a collar 9 formed thereon between two grooves 10, and this collar 9 has a port 8 communicating with the aperture 7 and adapted to communicate with the inlet 2 depending on the angular position of the plug. The port extends over twenty-five degrees of the plug periphery.

The grooves 10 serve to locate a packing ring 11 of annular cross-section which seats on the surface of that part of the collar 9 recessed to allow for the port 8. Thus the packing ring 11 is fitted horseshoe fashion, as can be seen in FIGS. 1, 2, 3 and 4.

The faucet is completed by a sealing gasket 12, fitted above the packing ring 11 in a suitable seating to bear against the surface of the chamber inside the body 1 and thus to provide tight sealing of the liquid. The packing ring 11 similarly bears on the surface of the chamber to seal the free end of the aperture 7.

The faucet may be operated in the following manner. To obtain maximum flow the plug 4 is turned so that the port 8 is directly opposite the liquid inlet 2, and the liquid is free to pass from the inlet through the port 8, aperture 7 and recess 6 to the outlet 3. If the plug 4 is turned slightly from this position so that the port 8 is only in partial communication with the inlet 2, the passage of the liquid is restricted and thus the outflow is reduced to an extent dependent on the degree of communication. If the plug is turned further so that the port is no longer in communication with the inlet, no liquid can pass and the faucet is thus closed.

What I claim is:
1. A faucet for controlling liquid flow comprising: a body having a chamber located internally thereof; angularly displaceable plug means disposed in said chamber; liquid inlet and outlet means leading respectively to and from said chamber; a longitudinal recess in said plug in communication with said outlet; a transverse aperture in said plug in communication with said recess; port means in said plug in communication with said aperture and adapted to communicate to a greater or lesser degree with said inlet means depending on the angular position of said plug with respect to said inlet means; and packing means in the form of a closed loop mounted on said plug extending around the periphery thereof from one side of said port means to the other side thereof and disposed between said plug and said chamber in horseshoe fashion to provide a liquid tight seal around said inlet means when said port means is angularly displaced out of communication with said inlet means.

2. A faucet for controlling liquid flow comprising: a body having a chamber located internally thereof; angularly displaceable plug means disposed in said chamber; liquid inlet and outlet means leading respectively to and from said chamber; a longitudinal recess in said plug in communication with said outlet; a transverse aperture in said plug in communication with said recess; port means in said plug in communication with said aperture and adapted to communicate to a greater or lesser degree with said inlet means depending on the angular position of said plug with respect to said inlet means; a collar formed on said plug means, said port means being formed in said plug between the ends of said collar, said collar overlying said inlet means when said port is angularly displaced out of communication therewith; an annular groove formed in the periphery of said plug on each side of said collar, the ends of said grooves terminating in said port means; and endless packing means mounted in said grooves and in said port means, said packing being bent back upon itself in horseshoe fashion around the ends of said collar in said port means forming an elongated loop around said collar with the ends of said loop spaced apart in said port means, said packing providing a liquid tight seal around said collar and between said plug and the walls of said chamber.

References Cited in the file of this patent
UNITED STATES PATENTS

| | | |
|---|---|---|
| 322,318 | Polle | July 14, 1885 |
| 543,692 | Keyes | July 30, 1895 |
| 2,482,873 | Roberts | Sept. 27, 1949 |
| 2,621,886 | Mueller | Dec. 16, 1952 |
| 2,854,027 | Kaiser | Sept. 30, 1958 |

FOREIGN PATENTS

| | | |
|---|---|---|
| 494,708 | Italy | May 29, 1954 |